(12) United States Patent
Teague et al.

(10) Patent No.: US 9,355,092 B2
(45) Date of Patent: May 31, 2016

(54) HUMAN-LIKE RESPONSE EMULATOR

(75) Inventors: Paul Teague, Kent Town (AU); Joko Sastriawan, St Marys (AU)

(73) Assignee: i-COMMAND LTD, Adelaide (AU)

( * ) Notice: Subject to any disclaimer, the term of this patent is extended or adjusted under 35 U.S.C. 154(b) by 1432 days.

(21) Appl. No.: 12/162,985

(22) PCT Filed: Feb. 1, 2007

(86) PCT No.: PCT/AU2007/000097
§ 371 (c)(1),
(2), (4) Date: Oct. 14, 2008

(87) PCT Pub. No.: WO2007/087682
PCT Pub. Date: Aug. 9, 2007

(65) Prior Publication Data
US 2009/0234639 A1    Sep. 17, 2009

(30) Foreign Application Priority Data
Feb. 1, 2006    (AU) ................................ 2006900464

(51) Int. Cl.
*G10L 15/00*    (2013.01)
*G10L 21/00*    (2013.01)
(Continued)

(52) U.S. Cl.
CPC .............. *G06F 17/2881* (2013.01); *G06N 5/02* (2013.01); *G06Q 90/00* (2013.01); *B60R 16/0373* (2013.01); *G09B 19/04* (2013.01); *G10L 15/265* (2013.01); *H04M 1/271* (2013.01)

(58) Field of Classification Search
CPC ....... G10L 13/00; G10L 13/043; G10L 13/08; G10L 15/00; G10L 15/08; G10L 15/18; G10L 15/19; G10L 15/1815; G10L 15/193; G10L 15/22; G10L 15/265; G10L 17/00; G10L 17/22; G10L 17/24; H04M 1/271; H04M 3/4936; B60R 16/0373; G01C 21/3608; C09B 19/04; A61B 17/00; A63F 13/00
USPC ............. 704/9, 275, 277, 270, 231, 246, 251, 704/257, 258
See application file for complete search history.

(56) References Cited

U.S. PATENT DOCUMENTS

| 6,408,277 | B1 * | 6/2002 | Nelken | ................. G06F 9/4881 705/7.15 |
| 6,505,162 | B1 * | 1/2003 | Wang et al. | .................... 704/275 |

(Continued)

FOREIGN PATENT DOCUMENTS

| JP | 2003-256421 A | 9/2003 |
| WO | 99/28809 A2 | 11/2002 |

OTHER PUBLICATIONS

"Verbot—Wikipedia, the free encyclopedia," Wikipedia [online], retrieved on Mar. 29, 2007, retrieved from the Internet: <URL:http://en.wikipedia.org/wiki/verbot>.

*Primary Examiner* — Paras D Shah
(74) *Attorney, Agent, or Firm* — Kenyon & Kenyon LLP

(57) ABSTRACT

Human-like response emulator stores a library (14) comprising one or more different subject matter data structures. Each data structure comprising a set of stimuli related to the subject matter of the data structure and one or more output instructions associated with each stimulus. Each output instruction is for producing a human-like response to the associated stimulus. The emulator receives a stimulus (16, 18). The emulator looks up output instructions in each data structure that are associated with the received stimulus. The emulator outputs (18, 20) one or more responses to the received stimulus according to the found output instructions

28 Claims, 12 Drawing Sheets

(51) Int. Cl.
*H04M 1/27* (2006.01)
*G09B 19/04* (2006.01)
*B60R 16/037* (2006.01)
*G06F 17/28* (2006.01)
*G06N 5/02* (2006.01)
*G06Q 90/00* (2006.01)
*G10L 15/26* (2006.01)

(56) References Cited

U.S. PATENT DOCUMENTS

| | | | |
|---|---|---|---|
| 6,604,094 B1 | 8/2003 | Harris | |
| 6,728,679 B1 | 4/2004 | Strubbe et al. | |
| 6,754,560 B2 * | 6/2004 | Fujita et al. | 700/245 |
| 6,754,647 B1 * | 6/2004 | Tackett et al. | 706/52 |
| 6,845,358 B2 * | 1/2005 | Kibre et al. | 704/260 |
| 6,961,706 B2 * | 11/2005 | Saito | 704/275 |
| 7,058,566 B2 * | 6/2006 | Shaw | 704/9 |
| 7,076,430 B1 * | 7/2006 | Cosatto et al. | 704/275 |
| 7,143,040 B2 * | 11/2006 | Durston et al. | 704/270 |
| 7,249,321 B2 * | 7/2007 | Bushey et al. | 715/747 |
| 7,260,537 B2 * | 8/2007 | Creamer et al. | 704/270.1 |
| 7,302,383 B2 * | 11/2007 | Valles | 704/9 |
| 7,548,610 B2 * | 6/2009 | Sierra et al. | 379/88.01 |
| 7,783,486 B2 * | 8/2010 | Rosser et al. | 704/270 |
| 8,060,364 B2 * | 11/2011 | Bachar et al. | 704/231 |
| 2002/0010589 A1 | 1/2002 | Nashida et al. | |
| 2002/0077815 A1 * | 6/2002 | Zhang et al. | 704/251 |
| 2002/0178005 A1 | 11/2002 | Dusan | |
| 2003/0023572 A1 | 1/2003 | Jowell et al. | |
| 2003/0130841 A1 * | 7/2003 | Bangalore et al. | 704/231 |
| 2003/0158733 A1 * | 8/2003 | Nonaka et al. | 704/255 |
| 2003/0181222 A1 * | 9/2003 | Raddant | 455/562.1 |
| 2004/0181392 A1 * | 9/2004 | Parikh et al. | 704/10 |
| 2004/0212505 A1 * | 10/2004 | Dewing | A61B 5/0002 340/573.1 |
| 2005/0060186 A1 * | 3/2005 | Blowers | G06Q 50/22 705/2 |
| 2005/0165607 A1 * | 7/2005 | Di Fabbrizio et al. | 704/256 |
| 2005/0171779 A1 * | 8/2005 | Joublin | 704/270.1 |
| 2005/0240413 A1 * | 10/2005 | Asano et al. | 704/270 |
| 2006/0020473 A1 * | 1/2006 | Hiroe et al. | 704/275 |
| 2006/0036430 A1 * | 2/2006 | Hu | 704/10 |
| 2006/0187068 A1 * | 8/2006 | Cohen | A61B 5/16 340/576 |
| 2006/0287868 A1 * | 12/2006 | Ikeda et al. | 704/275 |
| 2007/0003914 A1 * | 1/2007 | Yang | 434/236 |
| 2007/0008083 A1 * | 1/2007 | Berg | B60K 28/066 340/425.5 |
| 2007/0043573 A1 * | 2/2007 | Lu et al. | 704/275 |
| 2007/0150460 A1 * | 6/2007 | Evans | A63B 29/021 |
| 2008/0263451 A1 * | 10/2008 | Portele | G06F 3/167 715/727 |
| 2009/0018822 A1 * | 1/2009 | Rouvellou et al. | 704/10 |
| 2009/0037193 A1 * | 2/2009 | Vempati | G06Q 10/063114 705/7.15 |

\* cited by examiner

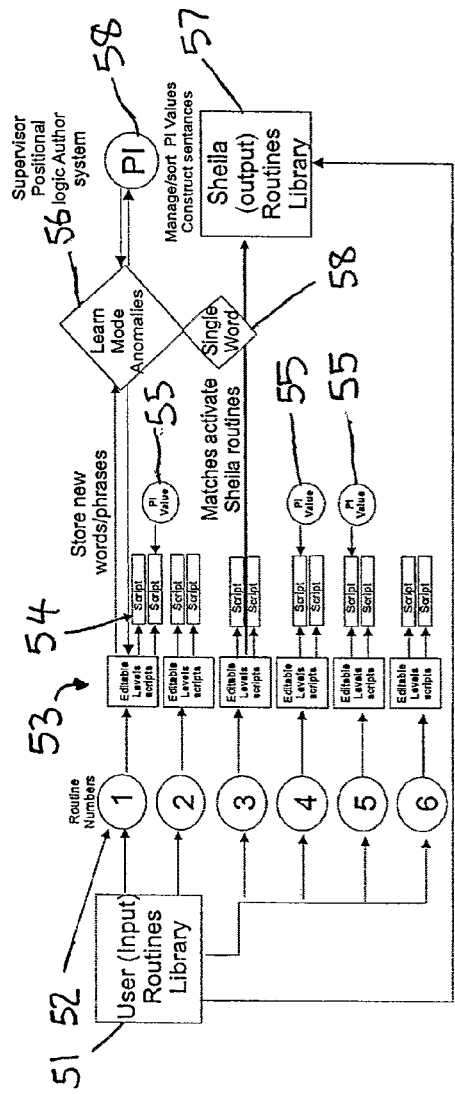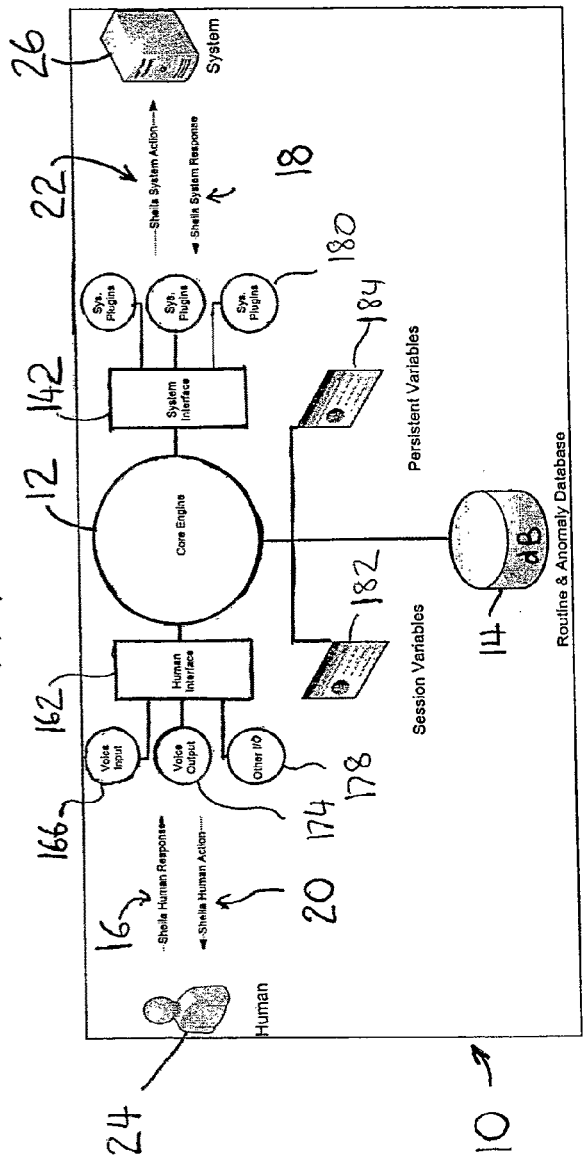
FIG. 4
FIG. 1

HUMAN-LIKE RESPONSE EMULATOR

FIELD OF THE INVENTION

The present invention relates to the field of computerised control and the man-machine interface, in particular the present invention relates to the field of human-like response emulation and digital data and process management.

BACKGROUND

Achieving a computer implemented human-like response is a difficult challenge in the field of computing. Expert systems have emerged that are able to examine input data streams and provide responses by selecting from possible alternatives. However these systems must be individually programmed for the specific task for which they are intended.

It is not possible to anticipate every input combination during the programming process. Addition of further input alternatives and corresponding responses generally requires further programming of the expert system. Furthermore knowledge contained within the expert system is generally only accessible to the programmer. It is usually not easy to easily extract this knowledge in a format which is accessible to a conventional reader.

The present invention seeks to provide a human-like response emulator that differs from other systems.

SUMMARY OF THE PRESENT INVENTION

In an aspect of the invention there is provided a method of emulating human-like responses comprising:
  storing a library comprising one or more different subject matter data structures, each data structure comprising a set of stimuli related to the subject matter of the data structure and one or more output instructions associated with each stimulus, each output instruction for producing a human-like response to the associated stimulus;
  receiving a stimulus;
  looking up output instructions in each data structure that are associated with the received stimulus;
  outputting one or more responses to the received stimulus according to the found output instructions.

In an embodiment of the invention the method comprises receiving a plurality of stimuli, looking up output instructions in each data structure that are associated with the received stimuli, combining the output instructions found, and outputting the combined responses to the received stimuli.

In one embodiment output instructions produce the response in the form of one or more of the following: language, an animated graphical display, voice characteristics, and/or control signals. The animated graphical display may be an animated face.

In an embodiment where the responses are language, they are in the form of one or more sentences constructed of one or more sentence segments. Each sentence segment conveys a coherent meaningful piece of information. Typically sentence segments are several words long. Each sentence segment is constructed of one or more words that have a relevant meaning in response to the associated stimulus. The sentence segments are human authored and are of the same type of response that a human would make if the human received the input stimulus.

In an embodiment sentence segments are associated with a sentence position category, which indicates where within a complete sentence the sentence segment is permitted to be located. In one embodiment the sentence position categories are beginning, middle and end. A sentence segment may be associated with more than one sentence position category.

Sentences are constructed from the associated sentence segments found according to their permitted location with each sentence according to the associated sentence position category/categories.

In an embodiment each output instruction is associated with one sentence segment. Alternatively each output instruction is associated with a scripted sentence.

In an embodiment each output instruction is associated with a priority rating, the output device delivers the output in an order according to the priority rating.

In one embodiment each data structure is arranged in a plurality of levels, where alternative contextually related stimuli are grouped in the same level. Preferably the look-up device is configured to initially limit looking within a level of the data structure for a stimulus matching one of the received stimuli and will only search outside the level if a match is not found. The look-up device records the previous level within which a match was found and initiates the next search for a match within the same level. Alternatively or an addition, the look-up device records the previous level within which a match was found and initiates the next search for a match within the next level down relative to the previous level. In the event that the lookup device fails to find a match within the current level, searching will proceed to parallel levels and then up through the levels of the data structure.

The levels for each data structure may be hierarchically arranged. Searching for matches will progress through the hierarchy is a match is not found. Each hierarchical level may have a plurality of parallel branches.

A history of matches may be recorded such that in the event that a match is not found in a level, and there is a choice of which level to search next, the history of matches is used to choose which level to search next. This allows a context of previous stimuli to influence how the future stimuli are interpreted. Stimuli may be in the form of human generated stimuli, environmental stimuli, or machine generated stimuli. The human generated stimuli may be speech. The speech will typically be converted to text. In one embodiment alternative text stimuli having the same meaning are recorded in the libraries at the same level and have the same associated response(s).

In one embodiment alternative sentence segments having different form but having the same meeting are stored in the data structure and when a match occurs one of the alternatives is chosen in a random manner for output.

In a preferred embodiment when a match to the input stimuli is not found in the data structure the new input stimuli is recorded and a taught response in the data structure. Typically the response is taught by a human by providing instructions for producing the response. Alternatively the response instructions are obtained from a data repository.

Preferably the new stimulus may be equated to an existing stimulus, which replicates the information recorded against the existing stimulus and associates it with the new stimulus in the same data structure.

In an embodiment the form of the data structure may permit alternative stimuli having the same meaning to be commonly associated with a set of response instructions.

In an embodiment when the new stimulus is added to the data structure a level within the hierarchy is allocated and recorded. When the new stimulus is added to the data structure other information is associated with the stimulus in the data structure.

In a further embodiment input stimuli are pre-processed prior to look-up of a match. In one embodiment the pre-processing involves applying mathematical and/or logical operations to the input stimuli.

In a further embodiment input stimuli are post-processed after look-up of a match. In one embodiment the post-processing involves applying mathematical and/or logical operations to the input stimuli.

In an embodiment matched stimuli are processed by applying mathematical and/or logical operations to the corresponding response instructions. In one embodiment this may negate the output of the response. In one embodiment this may produce another input stimulus for matching.

In an embodiment the library comprises selected data structures such that the human-like responses produced reflect a personality, in that the human-like responses are those which the personality would make. This is opposed to other possible human-like responses that another personality would make.

In an embodiment the library comprises selected response instructions that are instructional to a human observer.

In an embodiment the library comprises selected response instructions that are constructed to document events reflected by the inputs stimuli.

In an embodiment the library comprises selected response instructions such that the human-like responses encourage a discourse with a user.

In an embodiment the human-like response is self contained meaningful in its own right.

In another aspect of the invention there is a human-like response emulator comprising:
  a library stored on a storage device, the library comprising one or more different subject matter data structures, each data structure comprising a set of stimuli related to the subject matter of the data structure and one or more output instructions associated with each of the stimuli, each output instruction for producing a human-like response to the associated stimulus;
  an input device for receiving stimuli;
  a look-up device for looking up output instructions in each data structure that are associated with each received stimulus;
  an output device for delivering one or more responses to the received stimuli according to the output instructions found by the look-up device.

Another aspect of the invention provides a computer implemented method of construction of human-like sentences in response to an input comprising:
  providing a plurality of sentence segments, each sentence segment having sentence position information associated therewith and being a self contained and meaningful group of words;
  selecting a plurality of the sentence segments according to an input;
  assembling the sentence segments into a sentence according to the sentence position information associated with each of the selected sentence segments; and
  outputting the assembled sentence.

In one embodiment the sentence is output as text. In one embodiment the sentence is output as speech.

In one embodiment the sentence position information designates the sentence segment as being at one of: the beginning, middle or end of the sentence. Typically the sentence position information is in the form of a 1, 2 or 3, respectively.

In one embodiment responses are step-by-step human devised instructions to a human for reacting to a system event input.

In another aspect of the invention there is a method of searching for a hierarchically stored human-like response information associated with stimuli information such that similar stimuli are associated together in the same hierarchical level and different stimuli are associated together in deferent hierarchical levels, comprising:
  recording a designation of the previous stimuli;
  searching for a matching response to an input stimuli within the level of the hierarchy with the same response as the previous stimuli; and
  in the event that a matching response is not found searching for a matching input stimuli elsewhere in the hierarchy.

In one embodiment the search is then conducted sideways within the hierarchy. In the event that a match is not found the search is conducted sequentially upward through the hierarchy.

In another aspect of the invention there is provided a method of computerised speech recognition comprising:
  providing a hierarchically stored set of expected inputs in text form;
  receiving speech input;
  searching for an expected text input that matches the speech input within a level of the hierarchy that is the same as a previous matched input; and
  in the event that a matching text input is not found searching for a matching text input elsewhere in the hierarchy.

In one embodiment similar expected text inputs are associated together in the same hierarchical level. Expected text inputs are similar if they are contextually related.

In one embodiment the search is then conducted sideways within the hierarchy. In the event that a match is not found the search is conducted sequentially upward through the hierarchy.

Matching is considered to occur if the speech input is not sufficiently close to one of the text inputs under consideration.

In an aspect of the invention there is an apparatus for performing one or more of the above methods comprising a means for performing each of the steps of the respective methods.

In one aspect of the invention there is a computer program comprising instructions for causing a computing device to perform one or more of the above methods.

In another aspect of the invention there is a computer readable storage medium comprising a computer program as defined above.

BRIEF DESCRIPTION OF THE DRAWINGS

In order to provide a better understanding of the present invention preferred embodiments will now be described, by way of example only, with reference to the accompanying drawings, in which:

FIG. 1 is a block diagram of an embodiment of a human-like response emulator according to the present invention;

FIG. 4 is a functional block diagram of another embodiment of a human-like response emulator of the present invention.

DETAILED DESCRIPTION OF EMBODIMENTS OF THE INVENTION

Figure 2:
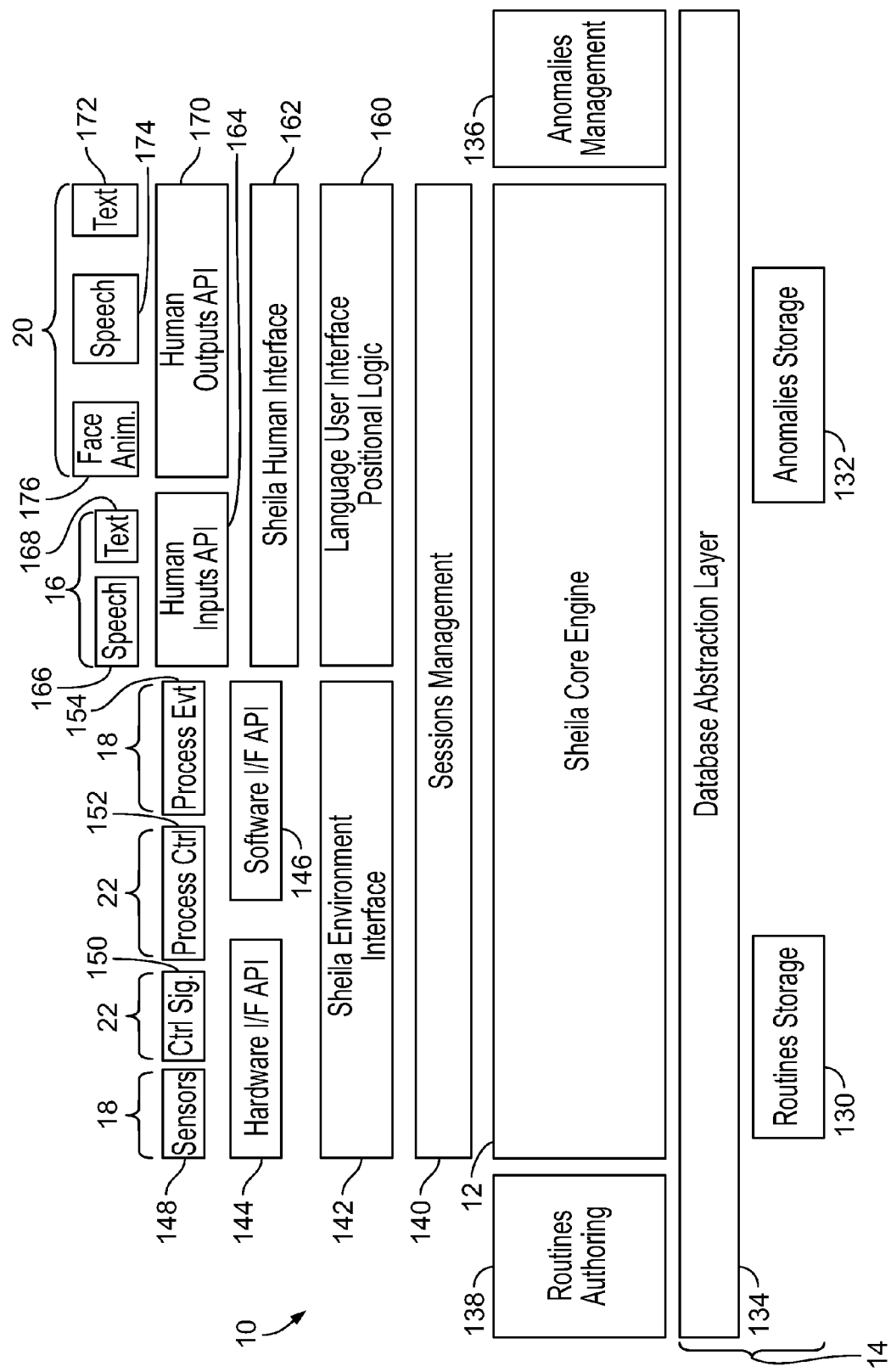
FIG. 2 is an architectural block diagram of an embodiment of human-like response emulator according to the present invention.

FIG. 1 shows an embodiment of a human-like response emulator 10 (HRE) of the present invention, which includes a core engine 12 in the form of a computer program running on a computer processor. The computer program is loaded on storage device, typically a hard disk drive, from a storage medium such as a floppy disk, compact disc (CD), digital versatile disk (DVD) or flash memory. The core engine 12 accesses a library database 14 of stored output responses associated with input stimuli. The library database 14 is stored on a storage device, such as a hard disk drive or RAM. Also stored on the storage device is an anomaly database. The core engine 12 monitors for inputs. In particular it receives human input 16 (such as an input received from a user) and a system input 18 (such as an input received from other software running on the computer, hardware components of the computer or external machine sources). The core engine 12 provides human output 20 (such as to the user) and a system output 22 (such as to hardware components or to other software). The human input 16 and human output 20 are intended to provide interaction with a human 24 via standard human interfaces such as a keyboard, mouse and microphone (for speech recognition) input devices, and a display and speakers (for speech synthesis) output devices. The system input 18 and system output 22 provide digital machine interfacing with a data processing machine 26, such as via operating system messaging or via hardware peripheral devices.

The core engine 12 accesses session variables 182 and persistent variables 184. These variables 182 and 184 are used to hold information used by the core engine 12.

FIG. 2 shows the HRE 10 in more detail and in the form of an embodiment in which the HRE is referred to as Sheila. In this embodiment the core engine 12 accesses the library database 14 through a database abstraction layer 134. The library database 14 is primarily stored in a routine storage 130. The data structures of the libraries contain associated input stimuli and response instructions. Response instructions are also referred to as routines. Further description of the routine storage 130 will be provided further below. The library database 14 is initially created and can be later updated using a library authoring process 138. In addition the library grows by an anomalisation process. The anomalisation process is handled by an anomalies management unit 136 which controls storage of anomalies in the anomalies storage 132. The anomalisation process is described below in further detail.

The core engine 12 interacts with humans and systems through a sessions management unit 140 and interfaces. The session management unit 140 maintains and accesses session variables 182 and persistent variables 184. The interfaces comprise an environment or system interface 142 and a human interface 162. The environment interface 142 interacts with a hardware interface API 144 and a software interface API 146. The hardware interface API 144 interacts with sensors 148, via plug-ins which receive a system input 18 detected by the sensors 148 in an external environment. The hardware interface API 144 also provides output control signals 22 via a plug-in and a signal generator 150. The software interface API 146 includes a process event interface 154 which receives system inputs 18 from software applications via an application plug-in. The software interface API 146 provides system outputs 22 in the form of software application control data via a plug-in and a process control unit 152.

The sessions management unit 140 interacts with a human via a language user interface 160 and a human interface 162. The human interface 162 interacts with a human inputs API 164 and a human outputs API 170. The human inputs API 164 receives human input 16 in the form of speech via a speech input device 166. The speech input device will typically comprise a microphone and a sound input peripheral. The human inputs API 164 also receives human input 16 in the form of text via text input device 168, such as a keyboard.

It is noted that human input from a mouse pointer device may be provided through the human input API 164 as an additional form of input, or it may be provided through the hardware interface API 144 as a sensor signal or preferably it will be provided in the form of a process control event 154 through the software interface API 146. For example the mouse interacts with the operating system and it is the operating system which provided the mouse input to the process event interface 154.

The human interface 162 provides human outputs 20 via a human output API 170. Text form human output 20 is provided by a text output device 172, such as a display. Speech form of human output 20 is provided by a speech output device 174, such as a sound card and speakers (or headphones), which is driven by a text-to-speech computer program. Graphics, such as an animated human face, form of human output 120 is provided by graphics component 176, such as graphical display generation software, a video card and a display.

The HRE 10 operates as a means of giving computers and machines the appearance of being human-like in their responses to stimuli. It allows humans to interact with computers and machines at a level more familiar and comfortable to humans. The user is more inclined to find the computer easier to deal with because the interaction is like dealing with another human. Often this is achieved by the HRE's ability to provide information to a human with human-like speech, in which sentences are constructed that sound like they were constructed by a human. It also allows the human to provide information to the computer in usual conversational speech, which can be interpreted by HRE and importantly an appropriate human-like response can be provided. In addition the HRE is able to receive system inputs and respond to the system or inform a human about system events in a human-like manner.

This human-like response of the HRE is achieved by use of the library database 14 containing human authored instructions for providing output responses to input stimuli. The output responses are human-like because they are human authored to be of the same type of response a human would be given in the same situation (that is if the human were presented with the same stimuli).

The library database 14 is a data repository in which one or more libraries are provided, each of which relates to different subject matter. In order to interact with a human a language library is provided. In order to interpret a system input one or more application relevant knowledge libraries are provided. In a simple embodiment the language library and the knowledge library may be integrated. Each library maps a number of possible input stimuli (related to the subject matter of the library) to an associated set of instructions to produce the desired response. The response may be a system output 22, a human output 18, or both.

Stimuli that the HRE receives are not limited, but are divided into the human inputs 16 and system inputs 18. Human inputs 16 can be for example textual language or speech. System inputs can be a message or signal such as a message that new email has arrived, a car radiator water temperature, the arrival of an SMS, a measurement of a distance or pressure sensor on a robot arm, or virtually an infinite number of other machine generated inputs which will depend on the application to which the HRE is put.

Typical human output 18 is textual language, which can be turned into synthesized speech. This enables the machine to mimic human language. Human output 18 responses also include visual outputs or other outputs for human senses. System outputs are virtually limitless and could be for example be a control message to open or control a software application (eg open an email), a control signal to manipulate a robot arm, a control signal to limit a vehicle speed, a control signal for a home security system or other machine signals, depending on the application of the HRE.

Receiving input stimuli and looking up a human authored response for output enables the HRE to act in a human-like fashion so as to perform human tasks, take on personalities, and even learn and instruct as a tutor. The HRE is also able to enter into meaningful discourse with humans.

Figure 3:
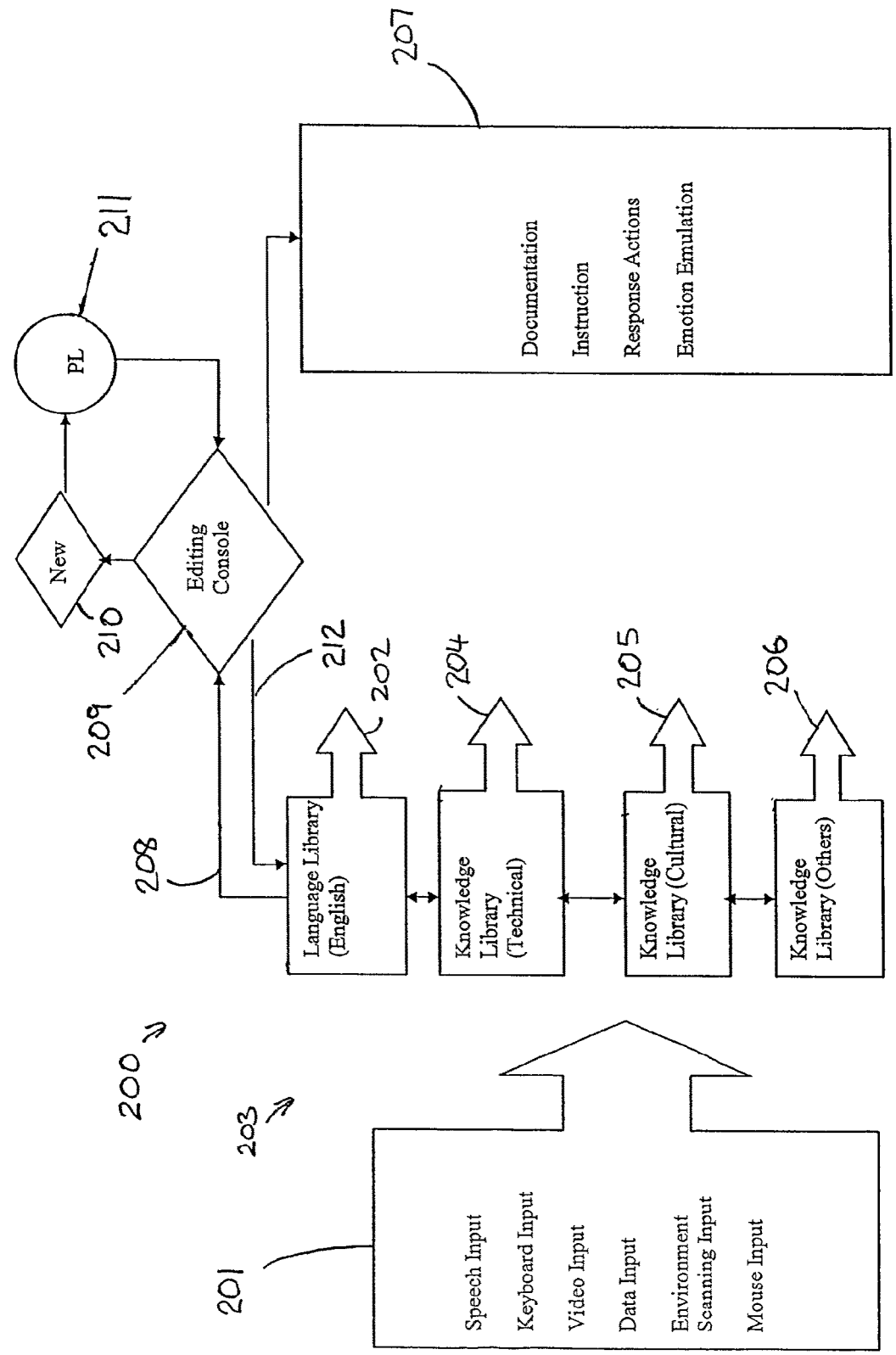
FIG. 3 is a function block diagram of an embodiment of operational schema of a human-like response emulation system of the present invention.

FIG. 3 is a functional block diagram of an embodiment of operational schema 200 of the HRE 10. The HRE 10 is provided with input sources 201 which receive human input 16 or system input 18 as is described above. Any inputs which a human or computer is capable of receiving and interpreting may be used. The core engine 12 compares the input to the library of input stimuli 14.

In this embodiment the inputs include speech input, keyboard input, video input, data input, environment scanning input and mouse input. Environment scanning inputs may include any form of surveillance or monitoring equipment with or without associated pre-analysis elements.

The library database 14 is comprised of a group of libraries 203 each of which include one or more stimuli that may be received through one of the inputs related to the subject matter of the library and an associated set of instructions for providing an outputted response according to the associated stimuli. Thus each library effectively acts as a look-up table. When the input is received the core engine looks it up in the libraries 203 and the corresponding output response instructions are provided back to the core engine 12 for output 207. Thus the HRE checks the language library, technical knowledge library, cultural library and other knowledge libraries for a match. Where matches occur the corresponding output response 202 from the language library is produced at 202, the corresponding response from the technical knowledge library is produced at the 204, the corresponding response from the cultural knowledge library this is produced at 205, and any corresponding responses from the other knowledge libraries are produced at 206. These responses 202, 204, 205, 206 are combined and output at 207. The form of the output 207 may be for example documentation of the inputs and instruction to undertake a particular task based on the input, a response based on the input or emotion emulation.

The language library which produces output 202 shown as English but it could be any written, spoken or indeed signed language. Knowledge libraries are those appropriate to the function of the system which is being controlled, documented or taught. In this embodiment there is also a technical library which produces output 204. This contains knowledge which is specific to a particular function, such as interaction with an operating system (such as one of the Windows operating systems, Mac OS, Unix, Linux, etc). Alternatively it could be an application specific technical knowledge for a control system, such as an air traffic control system, home security control system, motor vehicle computer system etc. The cultural library can provide responses 205 to deal with outputs in a manner appropriate to the audience. Other technical libraries may also be employed, for example a system for instructing the use of a word processor might use the technical library for various computer operating systems as well as the piece of software itself.

To begin with the libraries are each created by use of an authoring console.

Different libraries will be employed and different modes of action may be set depending on whether the system is acting in a learning mode, teaching mode, operational assistance mode, documentation mode or independent action mode. The knowledge of the system can be changed by adding or subtracting further appropriate libraries of relevant subject matter. This can in fact create the appearance of the human-like response system having different personalities depending on the libraries loaded within the library database 14.

The language libraries provide response instructions which are devised by one or more humans and would be expected to be made by a human and thus provide a human-like response to the input. The human-like response will include speech, video facial expression and other responses to the events that cause the input. This enables the computer to respond in a similar way that a human would react given the same circumstances.

A common application of the HRE would be a computer desktop management system in which the desktop management system would receive commands from a user as well as system inputs and would react to those inputs in the same way that a human would. For example upon the arrival of a new email, the email system would send a system input 18 to the HRE and as a result of looking up the response to this stimuli an instruction will be provided to inform the user that new mail had arrived.

Another common application for the HRE would be to provide instruction to a user. In this case the event that created the input would result in the response being an instruction on how the human should respond to that particular event as if the computer were an expert. Language will typically take the form of one or more sentences comprised of sentence segments. A number of sentence segments may be created as output instructions found in the libraries. The manner of assembling these into a coherent sentence will be described further below.

Thus the system is able to associate particular sentence segments with particular stimuli. These sentence segments are text streams in conversational English and as such it is possible for the system to document any arbitrary complex functions simply from the recorded stimuli and responses to it as would be provided by a human operator.

A human operator creates the libraries through an authoring process which maps a set of instructions for a human-like response into each input stimuli. Thus the libraries are authored such that if a human received that particular stimuli the human would undertake a particular response to that stimuli. The computer is then able to make this human-like response by following the output response instructions to achieve the same type of response that the human would. This may include instructions to provide audio output, video output or particular actions. Often the audio output will be in the form of text language converted to speech. The video output will be in the form of a facial emulation. The response might be in the form of control signals to a device. In the case of the human response emulator being connected to a robot the control signals may control the operation of the robot.

Authoring of the library database 14 should attempt to provide a unified set of responses covering most foreseeable inputs. Authoring should also be appropriate to each subject matter, for example, a language library would be created for producing language text outputs which are phrases describing the response to the stimulus. A knowledge library would output a response that may include language or instead or in addition may include other types of output such as control signals. In the case of a library which controls a video face it may output signals that control the facial expression of the video synthetic or artificial face. Other examples include information as emotive facial features for 3-D animated figures, robot with actions, emotions. A response authored by the human thus employs human intelligence or knowledge to resolve machine equipment procedure operated actions for machinery computers wherever specialized human knowledge is required this will enable the human-like response to be produced by the HRE.

The knowledge libraries are fully portable between applications. Therefore, for example, the English language library would not need to be re-authored when the system is applied to air traffic control as opposed to teaching.

If no corresponding entry is found in the libraries a signal is sent 208 to the anomalies management unit 136. The unmatched input becomes an anomaly and is stored in the anomalies storage 132. The anomaly as used by the HRE to learn a new response to this new stimulus. The new response for the new stimuli 210 is authored by a human. The anomaly may be handled by the HRE immediately by asking what to do with the new input stimuli or it may be placed in a queue and dealt with later. An alternative may be that if there is a close match with the library the anomaly management unit causes the HRE to query whether what was meant by the stimuli was the close match. In any event this still typically requires a human input.

Once the appropriate response is devised by the human user it is then stored in the library database 14 so that the appropriate libraries are updated. Once the anomaly has been incorporated into the library the next time the same stimuli occurs a response will be produced as has been authored by the human operator.

It can be seen that initially human authoring will be limited and that in time by exposure of the HRE to a diverse range of events and stimuli, its knowledge will grow by this anomalisation process such that it will eventually become mature and should be able to handle most events with anomalies becoming rare.

The ordering of language text phrases as responses and their output is managed by positional information associated with each phrase or sentence segment so that a plurality of sentence segments can be combined together in sentence in a coherent and meaningful way. The positional information allocated to each phrase is indicative of the sentence segment being positioned at the beginning, middle or end of a sentence or complex phrase. Thus for example each sentence segment that is associated with a beginning position could be allocated a one, each sentence segment that is associated with a middle position could be allocated with a two, and each sentence segment that is associated with an end position could be allocated with a three. Other positions may be possible as would other representations of position. Each authored response including a sentence segment will require an associate with a sentence position indicator. The use of sentence position indicators achieves a positional logic system.

When anomalies are processed the new response will typically include instructions to output a sentence segment in response to the stimuli. The sentence segment must be associated with a sentence position indicator 211 when it is stored within its library as indicated by 212.

The phrases may be allocated more than one positional indicator provided that the phrase is constrained to appropriately work within that position in a combination of possible sentences/complex phrases. Thus when a number of sentence segments are combined according to their position indicators they still remain human-like in the sentence and thus sound like a human language syntax.

Accordingly human-like language sentences can be constructed by the knowledge libraries upon receipt of associated stimuli to produce sentence phrases which are combined in order to provide appropriate human-like response. In addition other responses to the stimuli will also be output to produce other appropriate actions. A limit may be set so that a sentence constructed of sentence segments is limited in its length. Limitations may be in the total number of words or the total number of sentence segments that can be combined together.

A further embodiment of the HRE is in a program entity entitled Sheila and is described in relation to FIG. 4. Sheila is the name given to what is known as a graphical Face Font (animated character) and also a Human Entity (personality) using a Language Knowledge Library to provide a personality. The Face Font can be compared to a voice font. The combination of a Human Entity, Language Library, and a voice font together provide a human like personality and face. The face should be linked to the appropriate language library ie: male or, female.

For this implementation a separate animation library and facial generator provides the animation for the face and can be treated as a third party utility, although the character (Entity) and all animation is likely to be combined into one file in the future as the facial generator will be built into the software ie: Sheila Knowledge Library, where animation, emotion and so on are authored with scripts. This embodiment therefore shows only text generation, ignoring third party text to speech generation and facial generation functions for greater clarity.

In this language module there are two main types of Library files: Output Sheila responses 57 (scripts), and input User responses 51. In this case, input levels are used to speed processing 53. The format and structure are virtually identical for input and output, only the functions vary.

Information, commands, and requests are entered via the keyboard (or other suitable input device, for example, a speech recognition system) as user commands or responses to Sheila. The input is identified by matching the corresponding Level inputs 53, in the input library scripts 54. Parsing or tokenising could be used to match the appropriate routines but should not be needed in a complete routine with a mature library of scripts.

The human scripts pre-exist in the specific Language Knowledge Library; put there through Authoring in the Learn Mode Anomalising 56:

In this implementation, the format for all language and input files is that of a editable text file for both input and output routines and Sheila scripts.

The language library is level based (or stepped) within the Routines, limiting the extent of searching for commands or level specific related words.

The level number identifies the position in the library of the input so the corresponding output script will have only a few words that could be used. For example at Level 1, only a Yes or No answer can be given. However, the Level 1 script will allow many ways of saying yes including use of any one of multiple languages, accents, dialects and regional or cultural sub group uses.

In a very limited example, this could be represented as:
Level 1=<Yes>,<Sure>,<yup>,<maybe>,<Ya>,<OK>, <fire ahead>,<do it ><KeyBd 1>

Where a Yes type answer is required, a whole range of other Yes or No answers can exist. The answer is checked against the Level 1 routine which deals with Yes answers. The result will be a brief search to find the correct answer. Should the word be unknown the routine may ask the question "Do you mean Yes?", and add the new word, if appropriate.

In another example, the word, "nup" may be used as a human input meaning no; this would be assigned an existing meaning association for No.

If it were an unknown word, an anomaly routine 56 for dealing with unknown words will be called to learn the meaning of the new word.

A basic example would be:
If new functions exist routine-1
Level 1=<Would you like me to see if these are some additional new features?>
Input=Yes, run Yes-1 routine
Level 2=<Would you like to add these new functions, there is a small charge for the additional new feature of $1>
Input=Yes, continue routine
Run: Download demo—new functions from HR3D site-1
Comment: start download load and play demo then returns to, <If new functions exist routine-1> requests approval for money, on the ok; it charges the users credit card.
Once complete it returns to a <standby routine-1> or where it left off.

A further example may be an internet search. This internet search is activated by User Input command line such as
Search for <flowers>
I want to find <flowers>
How do I search?
Do you search?
Get me <flowers>
Buy something <Flowers>

The command language of the User Language Libraries is in the format: "I want . . . ; I need . . . for a birthday; please find . . . ; search for; "do this . . . "; "start Word", or "Internet Search, for . . . " Get me . . . a present for Christmas", etc. The language contained in the library is recognised by the system; creating the appearance of fuzziness.

Commands stored in the Sheila Language Library are in the form: "What can I do?", "Would you like?"; "I can do this . . . "; "I can do . . . "; Find info; "do this"; "start Word", or "Internet Search", etc.

Search routine is activated by input of such terms as:
I want to find <flowers>
How do I search?
Do you search?
Get me <flowers>
Buy something <Flowers>

To simplify the process hierarchical routine lists are identified then broken into Levels of Sheila responses for fast access to the correct action or answer. The system also provides the appearance of fuzzy logic or fuzzy questioning or responses.

The level based method is a way to process knowledge libraries for language by speeding up proceeding when accessing answers to question or generating standard discourses. The time taken to access the information is speed up dramatically as the application recalls what Level it is at. This is defined in authoring and may add what could be called an assist to the logic systems as well. The text response then has faster access time. When text to speech generators are in operation it is critical that searching is fast and the machine is not overloaded; if the script is slow or slurring of speech may occur.

Fuzzy Questions from user: The libraries are able to accept fuzzy questions (or questions that appear fuzzy or vague, unrelated in any way to the current fuzzy logic, the language exists in the specific Language Knowledge Library. The search language ie: "I want; I need; For a birthday; please find; search for" is language contained in the library and is recognised by the system; creating the appearance of fuzziness.

Language required is not typically command based, but can now be more like I want, I want, I need to find etc.

Human Font Routines are activated by User input, then finding the right routine that activates the Human Font (Sheila).

The Personal Actions Library is assigned to an event by the user, which deals with the relationship between the occurrence of an event and the performance of a task by the system. The assignment is for example an SMS when an occurrence may occur such as an alarm in the house connected to the computer.

Figure 5:
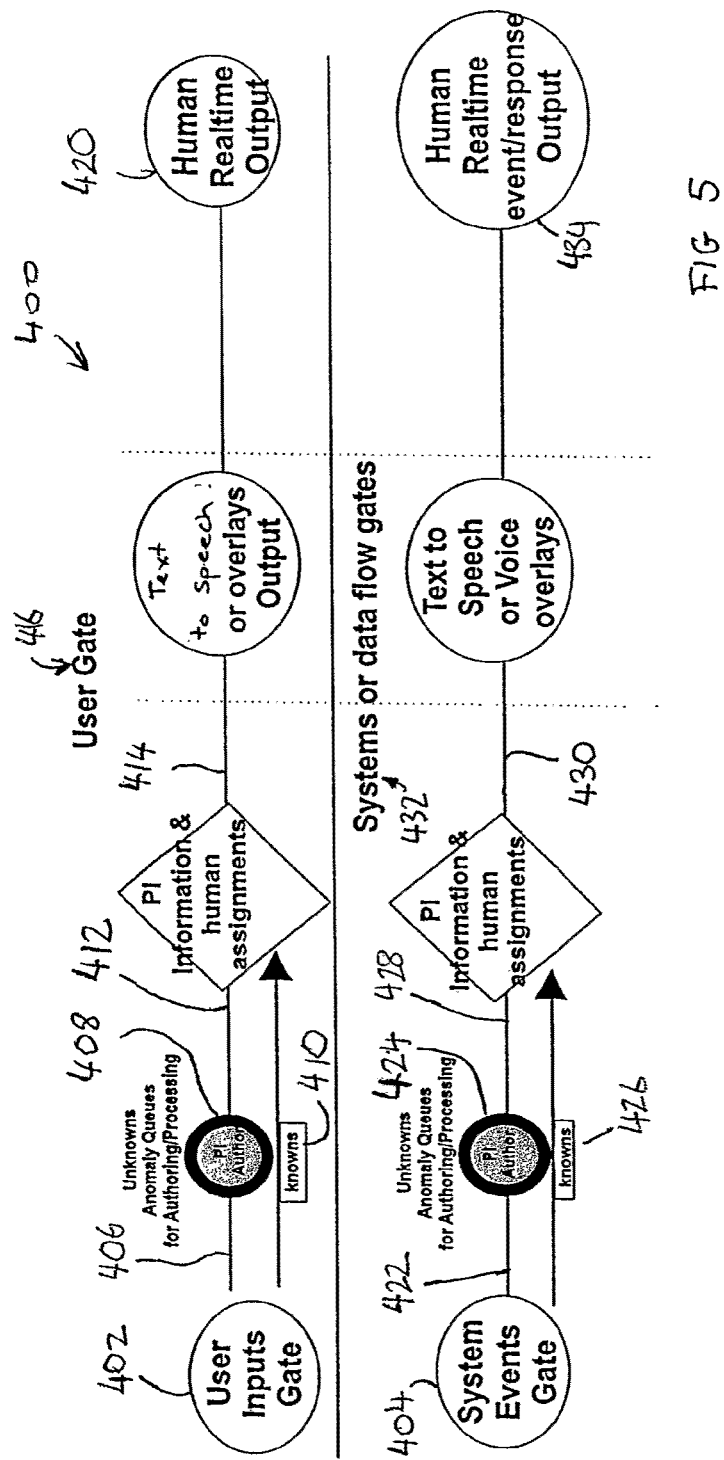
FIG. 5 is a data flow diagram of a an embodiment of a human-like response emulator of the present invention.

FIG. 5 is a dataflow diagram which shows user inputs received at a user input gate 402. The human inputs which are unknown 406 are sent to the anomaly system for authoring of responses at 408. Known human inputs 410 and anomalies that have been authored 412 have their responses retrieved and human outputs 414 are sent to a user gate 416. In this embodiment the user gate applies text to speech conversion or overlays output. The output is then sent to human real-time output 420.

The system inputs a receiver system event date 404. System inputs which are unknown 422 are sent to the anomaly system for authoring of responses at 424. Known system inputs 426 and anomalies that have been authored 428 have their responses retrieved and system outputs 430 are sent to system or dataflow gates 432. In this embodiment the system or dataflow gates 432 applies text-to-speech or voice overlays to the output. The output is then presented to the human real-time event/response output 434.

Figure 6:
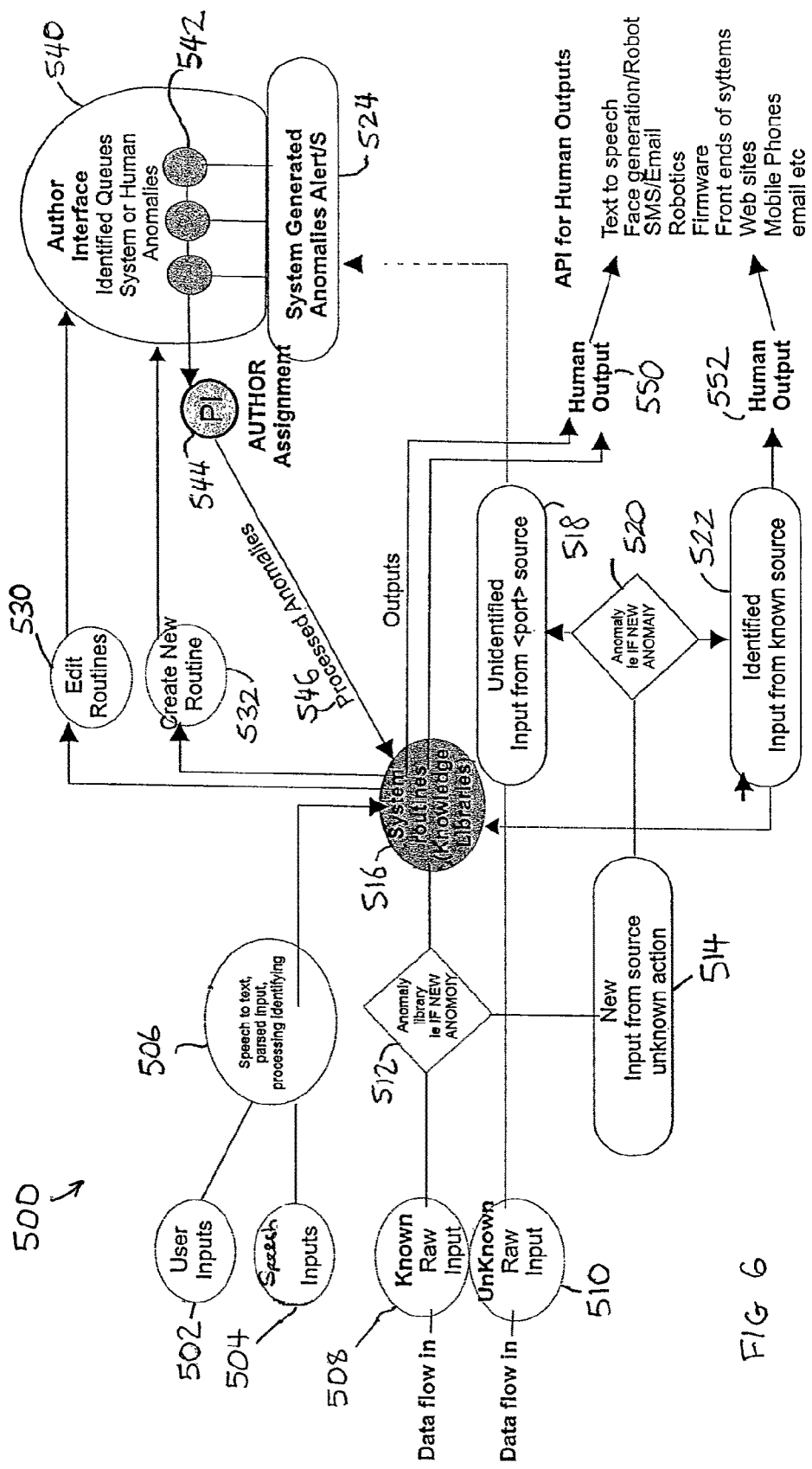
FIG. 6 is a schematic flowchart of an embodiment of a human-like response emulator according to the present invention.

FIG. 6 shows a flow chart of an embodiment of a HRE 500. User inputs are received at a user input 502 or a speech input 504. Inputs 502 and 504 undergo speech to text recognition, input parsing and processing to identify the input at 506. It is assumed in this embodiment that the identified user input is contained within the knowledge library. However if this were not the case the identified input would be sent to the anomaly queue.

System imports are divided into known raw input 508 and unknown raw input 510. The known raw inputs 508 are checked at 512 against the anomaly library to determine whether it is a new (unknown) input from a known input source or a known input form an unknown action source at 514. Known inputs that are not in the anomaly library are sent to the system routines 516 for looking up the knowledge library.

Known inputs from an unknown action source are checked at 520 to determine whether they are identified from the known input source 522 or if they cannot be identified at 518 they go to the anomaly queue 524. Data from unknown inputs 510 are sent to the anomalies queue 524.

The user may edit the routines at 530 or create a new routine at 532. This activates the Author Interface 540. Likewise if the input is in the anomaly queue the user may deal with these by activating the Author Interface 540. Identified queues of anomalies are edited at 542, by being associated with a response in the form of a sentence segment. A sentence position indicator is assigned to each response sentence segment at 544. Processed anomalies are entered into the knowledge library at 546.

Once the output response associated with the input is found in the knowledge library the response is sent to human output 550 which then go to an API for Human Outputs. This may generate a number of outputs, such as text-to-speech, face recognition, robotic control, SMS/e-mail, front end systems, websites, mobile phones, e-mail etc.

Data from the identified input from unknown source 522 queue is also sent to a human output 552 which uses the API for Human Outputs.

Figure 7:
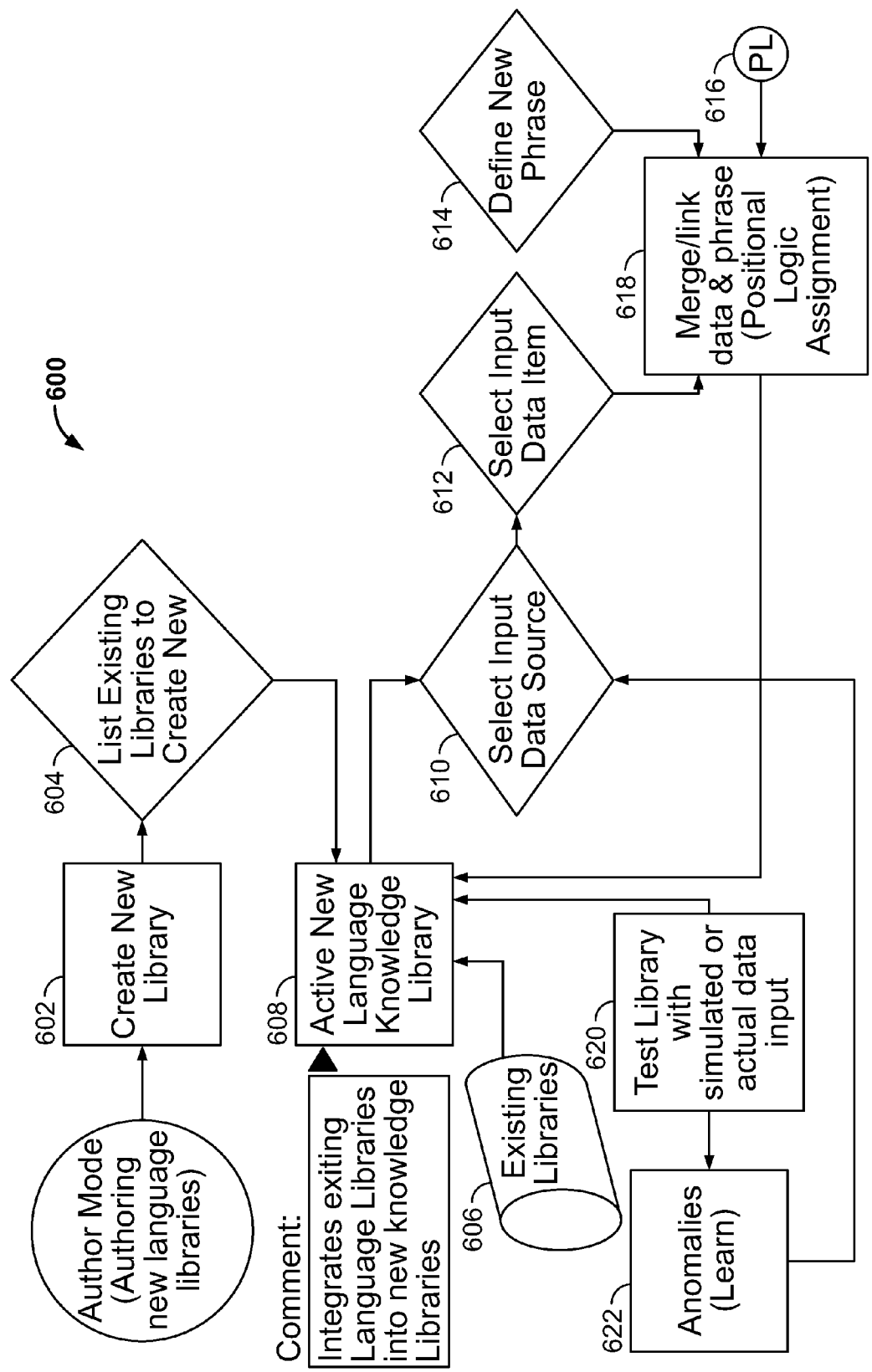
FIG. 7 is a schematic flowchart showing creation of a library used in an embodiment of a human-like response emulator of the present invention.

FIG. 7 shows the authoring process in more detail using an authoring module 600. The process begins when the user decides to create a new library 602. Existing libraries are listed at 604. If an existing library 606 is better suited then it may be selected to be supplemented, rather than a new library being created. Additionally the contents of an existing library 606 may be integrated into the new library. It will be common for a language library to be integrated into a new knowledge library. The new active library is ready for the addition of new entries at 608.

A new entry is made by selecting an input data source at 610. A data item from the data source is then selected at 612. The user then defines at 614 a sentence segment provided as a response when the selected input is generated at the selected data source. Positional information for the sentence segment is selected at 616. The selected data item defined sentence segment and selected positional information are merged or linked together at 618 and incorporated into the new library 608. The library can be tested with simulated or actual data input at 620. Any anomalies that are created are entered into an anomaly queue at 622. Those anomalies then become new entries for selection of the input data sources 610 and the remainder of the anomalisation process can occur.

In addition or instead of defining a new sentence segment, a system action may be defined as a response.

Figure 8:
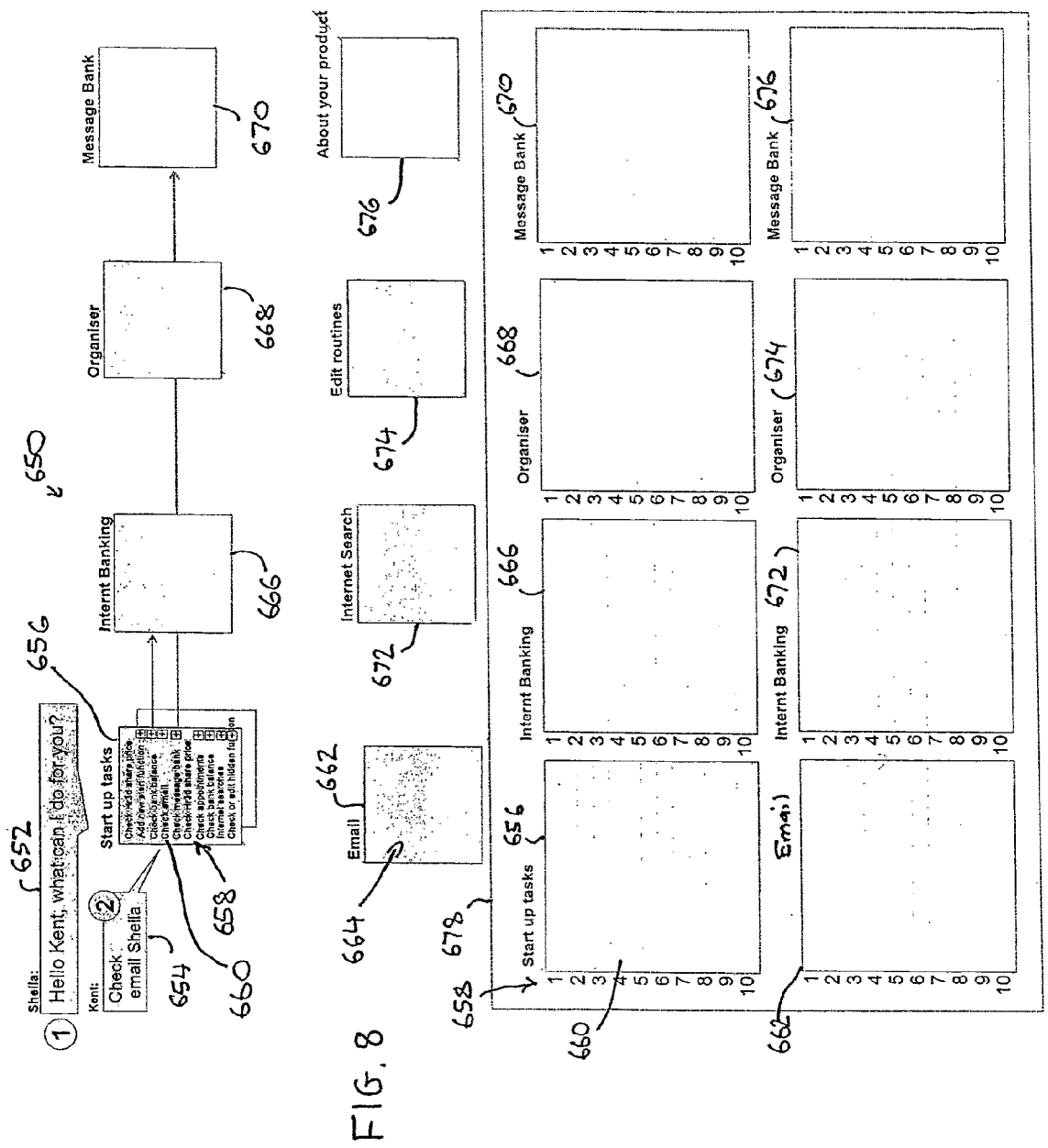
FIG. 8 is a schematic template showing creation of the library according to the process of FIG. 7.

FIG. 8 is a schematic template showing the construction of the library. In this example the user's name is Kent and the HRE is again referred to as Sheila. When the user logs in Kent is entered as a session variable. At 652 Sheila addresses Kent, "Hello Kent, what can I do for you?" Kent then provides an instruction to Sheila at 654, "Check email Sheila". The HRE has a set of start up tasks listed as 656. These are level 0 tasks in the hierarchy of the library. These tasks form a set of expected responses 658 when the system is at level 0. The input 654 from Kent is parsed with the keywords "check email" identified. This matches with one of the expected inputs 660 "check email". As a response the HRE will then initiate a level drill down (to level 1) and will perform the "check email" command. Typically this will involve interfacing with the email software application and identifying whether there any new email has arrived. Depending on the configuration of the system the HRE may announce how many new emails have arrived, simply open the email application or do other things appropriate to the check email command. A further set of responses will be listed at 662.

The conceptual template 650 contains a number of example subject matter related response subject matters 650. In this example apart from the previously mentioned email set of routines 662 there is also listed internet banking 666, personal organizer 668, telephone message bank 670, internet search 672, edit routines 674 and a set of routines about a product 676. Within the box 678 each of the routines 656, 666, 668, 670, 662, 672, 674 and 676 have a list of expected inputs 658. When devising the relevant library and its routines such a conceptual template assists in creating an initial set of expected inputs and necessary responses.

Figure 9:
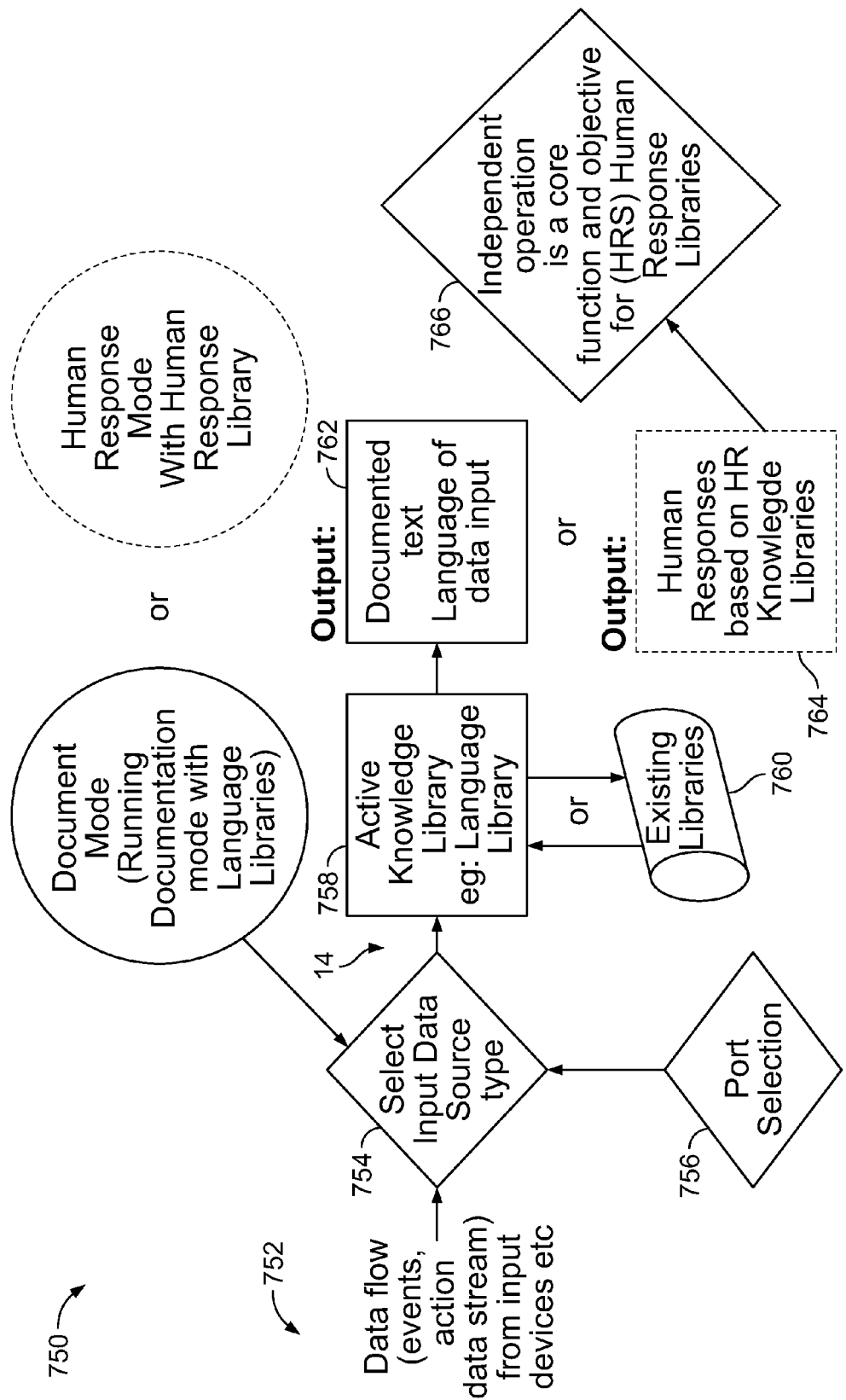
FIG. 9 is a schematic flowchart of showing use of a library to look up a response according to an embodiment of a human-like response emulator of the present invention.

FIG. 9 shows a process 750 of looking up a response to a data flow 752 input in a library database 14, which may be in the form of events, action data stream from input devices etc. Alternatively or in addition the input may be a human input.

Depending upon the configuration of the HRE it may run in document mode which documents the incoming flow of system inputs. Alternatively it may run in a human response mode which will respond to human inputs. Other modes of operation are also possible. In this embodiment the system is running in document mode and therefore at 754 the system selects the input data source type from a port selection 756. This enable a reference to an input device. The input is then compared to the libraries 14. In this instance an active knowledge library, for example the language library, may be initially searched. If a match is not found then other existing libraries 760 may be searched. When a match is found the corresponding recorded set of response instructions is executed so as to create the output 762. In this case the output will be documented text language describing the data input. In the alternative mode of operation (human response mode) a human response will be output at 674. Furthermore the system may operate in independent mode which will provide system outputs in response to system inputs at 766.

Figure 10:
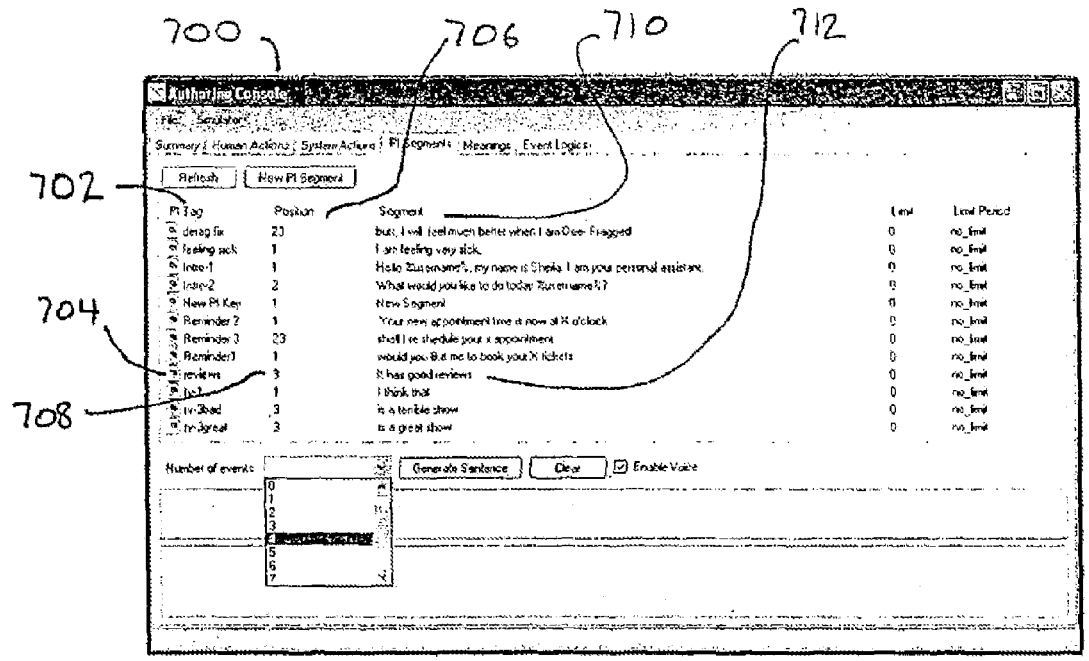
FIG. 10 is a screen capture of an embodiment of a human-like response emulator of the present invention.

Referring to FIG. 10, a screen capture 700 shows an example small library, which include a number of category headings. The category headings including tag heading 702 (which is a tag to an input), segment 710 (which is a sentence segment that is output upon receipt of the input identified by the relevant tag), and position 706 (which identifies the sentence segment position at which the segment is valid within a sentence). Accordingly as an example, when the input which is tagged with "reviews" at 704 is received it will produce a sentence segment output 712 which is "it has good reviews". This sentence segment is valid as indicated at 708 in the $3^{rd}$ sentence position (the end of a sentence).

Figure 11:
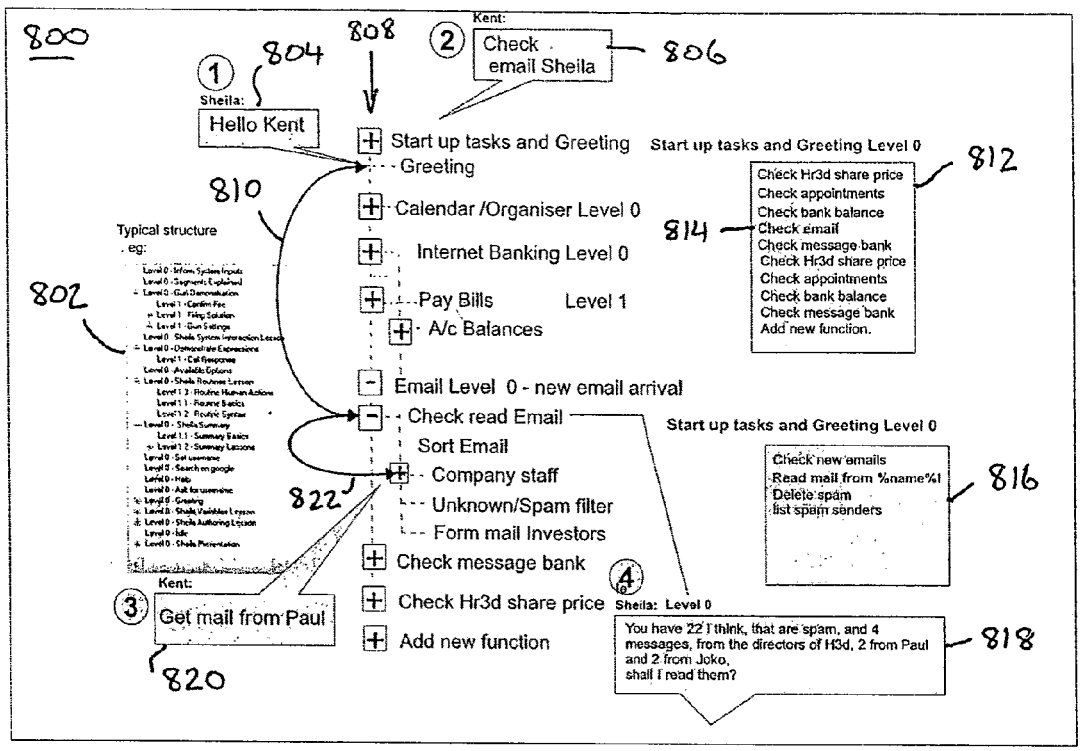
FIG. 11 is a schematic representation of searching of a library of an embodiment of a human-like response emulator of the present invention.
Figure 11:
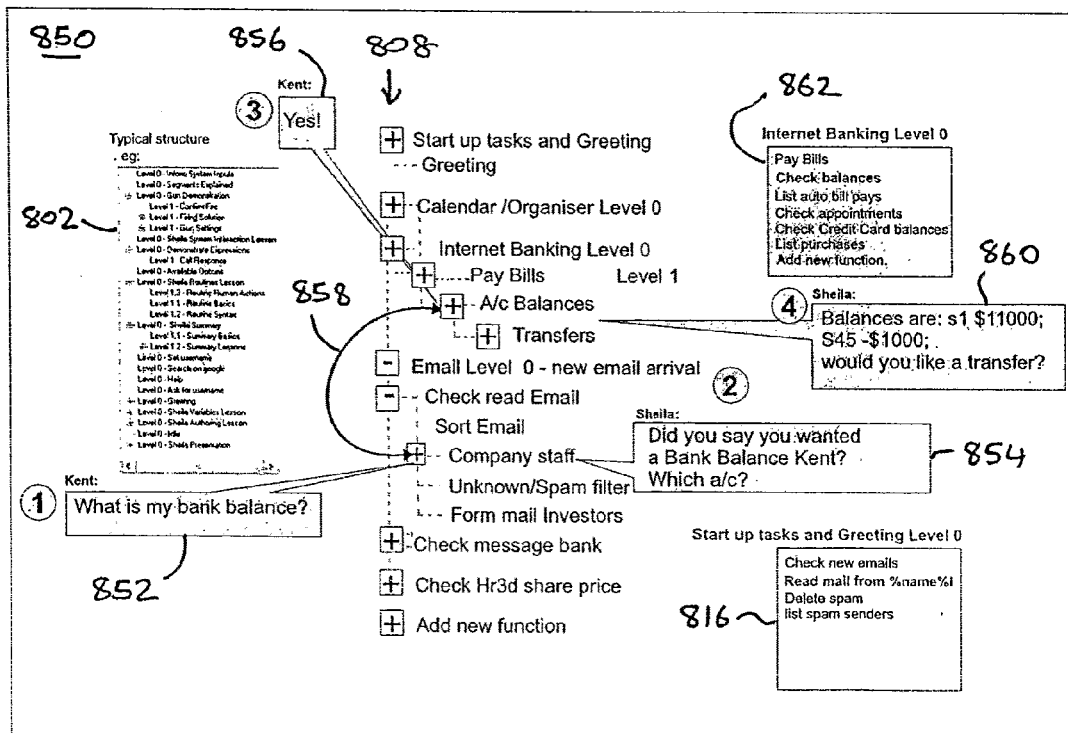

Referring to FIG. 11, which shows a schematic sequence 800 of an interaction between the user Kent and the HRE called Sheila. An example library structure is shown at 802. In this sample structure it can be seen that certain set up level 0 inputs are expected. Some of those have further level 1 inputs expected and some of those have further lower level inputs expected. In this example the user of Sheila says at 804 "Hello Kent" at 806 Kent responds by providing the command "check email Sheila". A list of expected inputs is shown at 812. A list of levels is shown at 808. The check email instruction is found at 814 in the expected list 812. Its input initiates a response listed in the box 816 which includes checking for new emails, reading email from the name of a user, deleting spam, listing spam senders. The current context of the system proceeds from the level 0 which is the greeting at 810 to the check email level.

Sheila may then announce at box 818 that "you have 22 I think that are spam, and 4 messages from the directors of HR3D, 2 from Paul and 2 from Joko, shall I read them?" Kent then says at 820 "get email from Paul". Within the check email level a search is conducted for a match to the input "get email from Paul". This is found within the Company Staff level. The context then descends from a check email level via 822 into the company staff level. Sheila can then proceed to open the emails received from Paul. Thus when the command 820 is issued the search for a matching input only initially occurs within the check email level and below.

The schematic sequence 850 shows what happens when a match is not initially found. In this example when the current level is within the company staff of the check email level such as in the previous example, Kent issues an instruction at 852 "what is my bank balance?" A search in the company staff level does not reveal a match, thus the search escalates to within the check email level and also fails to find a match. The search may then escalate a further level which is the start up level. This may either result in a match being found due to the key phrase "bank balance" or a match may not be found as it is not specifically part of the start up level, in which case the entire library may be searched. In the event that bank triggers a drill down to the internet banking level or in the event that an entire library is searched, a match will eventually be found in relation to bank balance. Since this was not within the current context an optional confirmation may be made. In which case Sheila states at 854, "did you say you wanted a bank balance Kent, which account?" Kent replies at 856, "yes". The level of the current context then moves 858 from company staff within the email branch of the hierarchy into the account balances branch of internet banking. Within the internet banking level a series of expected responses 862 are listed which includes "check balances". Sheila at 860 will then announce, "the balances are at S1 $11,000; at S45 $1,000; would you like a transfer?"

Each possible input can be listed with further expected inputs, which can determine the next action undertaken. There are several generic input definitions that can be used to represent an expected human input. These include:
  (1) <any>: to catch any input received, this will be evaluated as a last resort;
  (2) <0>: to catch a blank input, such as a time out or any response defined as representing 0;
  (3) <yes>: to catch any input that means yes or is defined as a yes value; or
  (4) <no>: to catch any input that means no or is defined as a no value.

There are several types of expected input that can be defined on a human output which in turn defines the expected type, these are:
  (1) boolean: Yes/no/O type input expected;
  (2) text: any text that should be perfectly matched;
  (3) key word: any segment to be found in the sentence; or
  (4) expression: like key word but the recorded input is in the segment after the key word.

When an input is received that is not Boolean it needs to be interpreted. By specifying the type of expected input this assists in interpreting the input. Usually key words are identified by matching stored segments to a sub-string of an input sentence. For an expression input, the recorded input may become a value entered in a session variable for later use. For example "please transfer $1000 from my savings account to my cheque account". The value of $1000 will be entered in a session variable to use in the transfer and for reporting of completion of the transfer.

Figure 12:
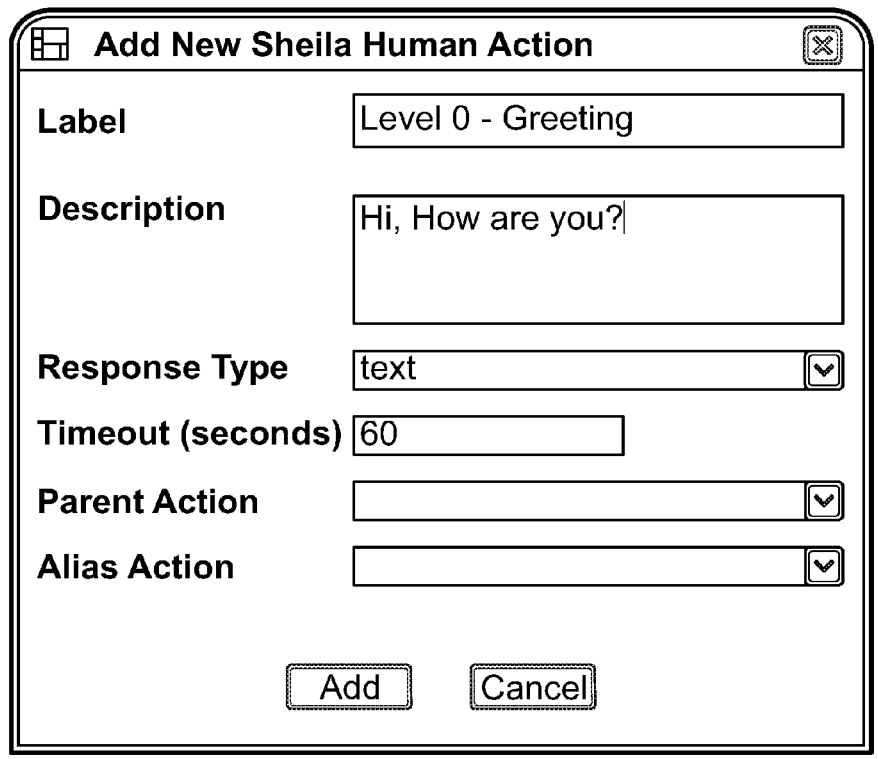
FIG. 12 is a screen capture of an embodiment of a human-like response emulator of the present invention.

Referring to FIG. 12 which shows a screen capture of a window for entry of a new human output, in which, whenever the user says "hi" the HRE will respond with "hi, how are you?" The response is provided with a label which includes its level, in this case it is "level 0—greeting". The response will be a human output, also termed a human action, is given in the description box "hi, how are you?" A input type (human response) expected is text. It is given a time out period of 60 seconds. Additionally a parent action may be entered or an alias action may be entered. Parent action is the context which is directly above the current context/action. Alias action is a context where look-up of responses of this action can be done.

Figure 13:
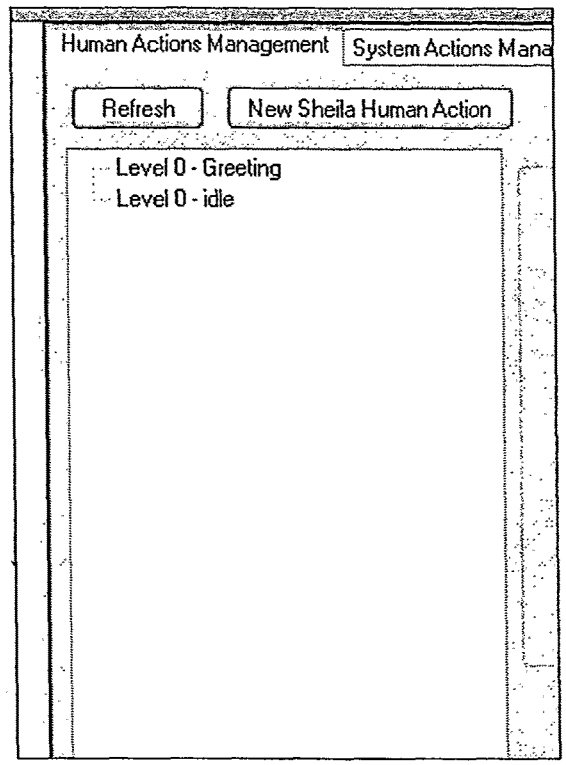
FIG. 13 is a screen capture of an embodiment of a human-like response emulator of the present invention.
Figure 14:
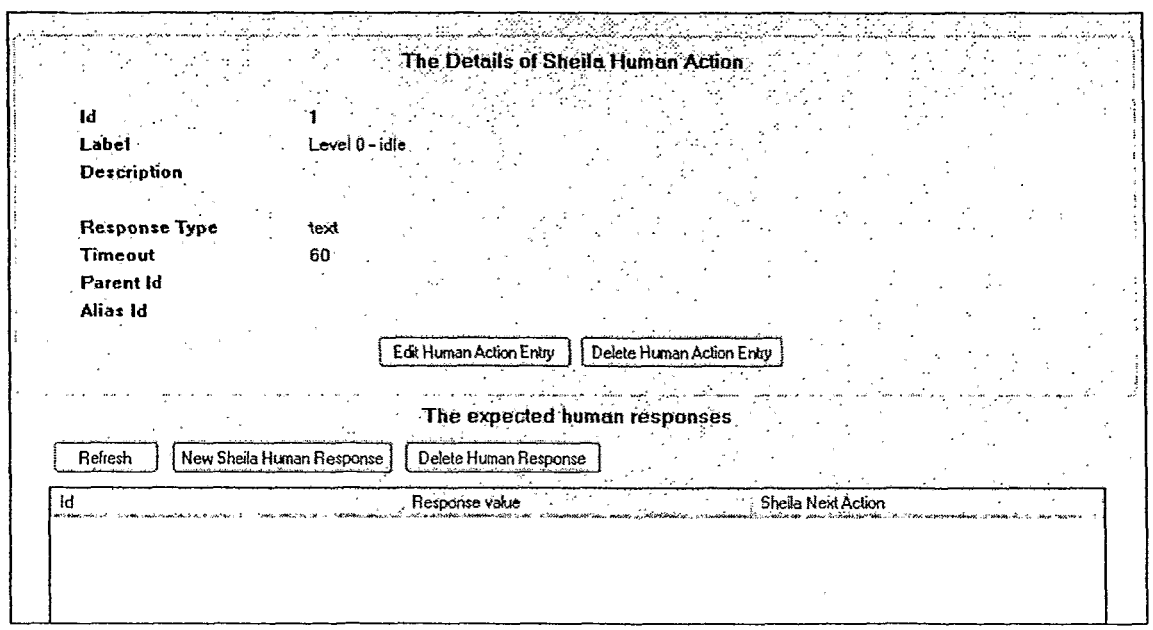
FIG. 14 is a screen capture of an embodiment of a human-like response emulator of the present invention.
Figure 15:
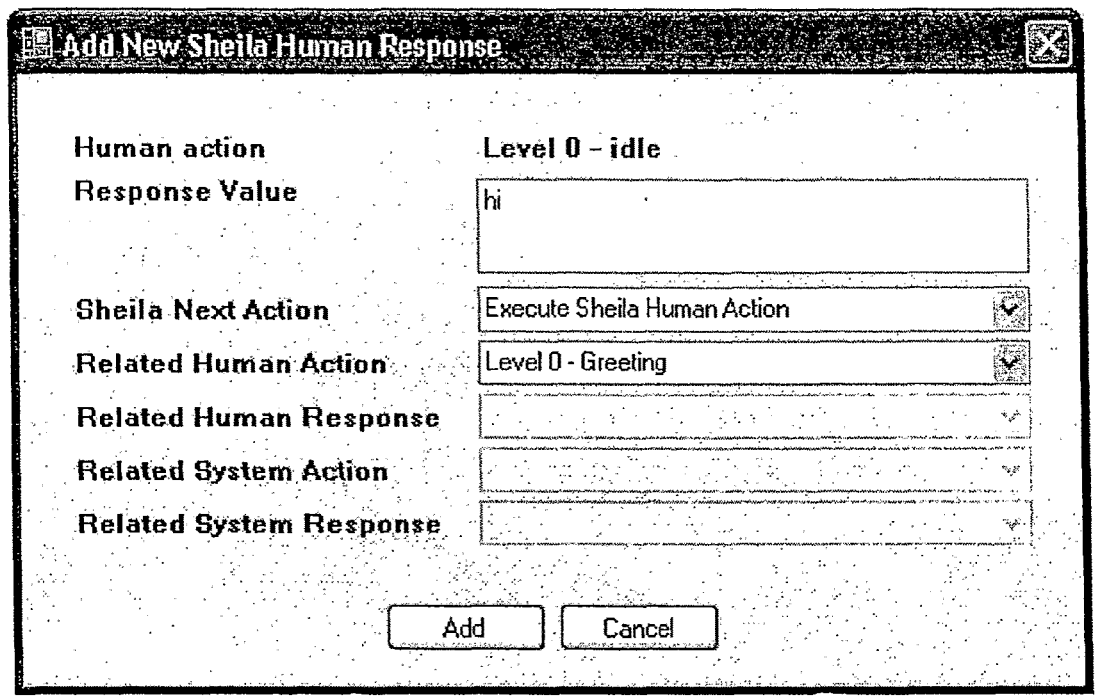
FIG. 15 is a screen capture of an embodiment of a human-like response emulator of the present invention.

One Added, this will then be listed in a Human Actions Management tab of the window shown in FIG. 13. This tab lists all of the human outputs the HRE can produce. By selecting it, the details of this human output (human action) can then be seen as shown in FIG. 14. The "New Sheila Human Response" button is selected in FIG. 14, which will enter the input that triggers this response form the HRE. The window shown in FIG. 15 will then be entered. The Human Action Response Value is entered as "hi", which means that when the human input says "hi" the HRE will execute the human output (listed in the Related Human Action box), namely the human action level 0—greeting.

A related human response can also be entered as can be related system action and a related system response. The next action defines what action will be taken when the response is encountered. Each next action requires certain related values to be set. Related human action defines the human action that is required as the parameter of the next action, and so do the related human response/system action/system response.

Figure 16:
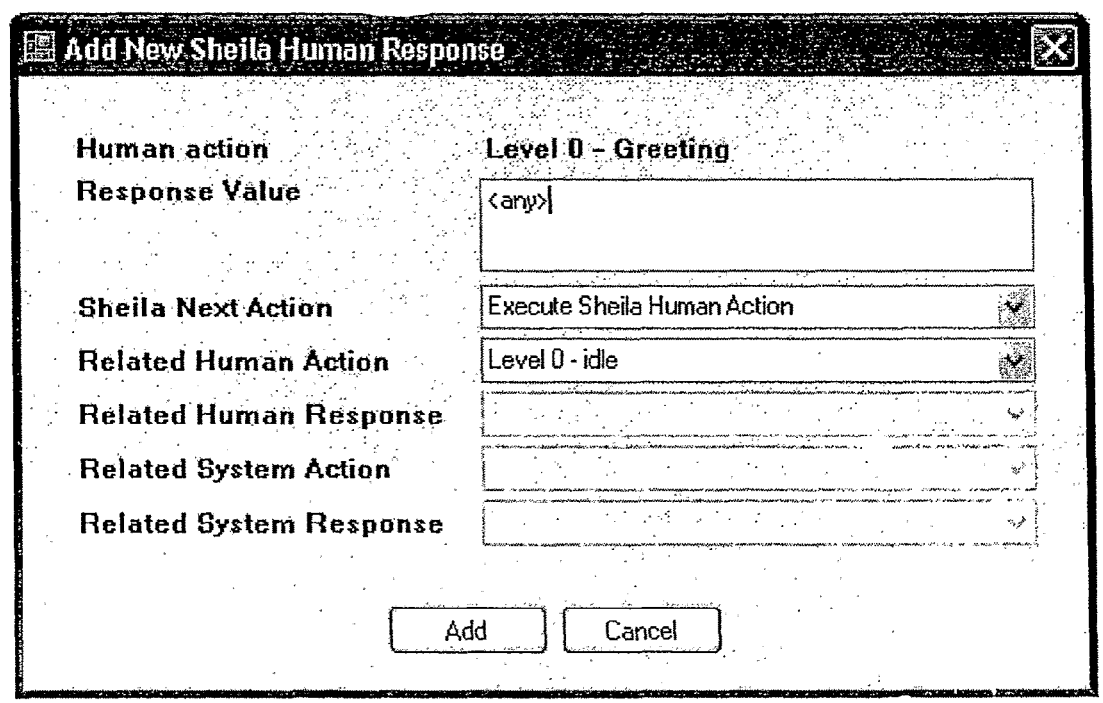
FIG. 16 is a screen capture of an embodiment of a human-like response emulator of the present invention.

Clicking on "level 0—greeting" tree view of FIG. 13 will open the level 0—greeting for editing. Any response provided by the human (as indicated by a response value) will result in the system returning to level 0—idle as shown in FIG. 16.

As a result when the HRE is idle and the user says "hi" this will trigger a response of a greeting in which the HRE will say "hi, how are you?" by execution of the level 0—greeting and will then return to level 0—idle state.

Human beings in normal discourses are awaiting a response from the other person in the discourse. This can be imitated by outputting a response that expects a Boolean response from the user. As a result continuing discourse is encouraged. However asynchronous or unexpected events (system input or human input) can be accommodated even if the HRE is currently in the wrong state. It will simply expand its search for a match to the input and find the new context of the event.

Humans usually vary the way that the say the same thing each time. Repetition can be avoided to some extent by ordering sentence segments differently each time or by choosing different sentence structures in a random like manner. Also different response sentence segments having the same meaning can be provided and chosen. Furthermore a limit and period can be defined for each segment. The HRE will take this into account when it performs the next selection.

Levels can be used to classify the human/system actions in a tree-like hierarchical fashion, the deeper an action within the three, the more specific it is. By recording previous inputs and using the last input as an indication of the current context, searching for the next expected input can occur within the current level of the hierarchy. This reduces the amount of searching that is required in most cases and produces a more accurate recognition of the input because the number of possibilities within the current context is limited.

This contextual focus enables a dynamic closed domain speech recognition, where a list of expected responses is known. Because of the tight focus this list of alternative expected responses will be small. However this list will also change with each change in contextual focus. The result is very accurate speech recognition.

Each output instruction can be associated with a priority rating. The outputs can then be delivered in order according to the priority rating.

The use of prioritisation can be demonstrated as follows:
Method 1

A HRE installed in a motor vehicle receives the following inputs: engine oil pressure low, engine overheating is system event in an unprioritised manner. The HRE response could be to shut the motor down, or issue a warning the motor will shut down in X seconds. It may discuss the problem with the driver where the driver could override the shutdown in an emergency.

Method 2

The HRE has a library with authored prioritization, therefore when the prioritized events are occurring levels of action can be taken, which can allow for numerous levels of actions for events.

Non important events may be just put into an event queue and reported on when in a certain context. Important events can be dealt with immediately.

The input stimuli may be subjected to pre-processing prior to look-up of a match. In addition or instead the input stimuli may be subjected to post-processing after the look-up of a match. The processing can involve applying mathematical and/or logical operations to the input stimuli. Also matched inputs can be processed by applying mathematical and/or logical operations to the corresponding response instructions. This may negate the output of the response and/or may produce another input stimulus for matching. Such processing logic can assist in interpreting events. It may be desirable to process logic after a response is looked up, because important events must be executed immediately. Putting logic processing before response lookup could delay the next action to be taken.

Multiple non-significant events can lead to important events. For example, consider a. HRE implemented as a volcano monitoring system. The system receives the following events:

A ground water is heating up (normal occurrence in active volcanoes)
B little tremors is being reported by the seismograph (normal)
C animal migration (normal unless combined with other event).

If three such events occur at the same time, it can mean an eruption is imminent (event D1). In this case a processing logic rule can be written, such as A+B+C–>D1.

When system receives inputs, it can take immediate action or it can put them into queue. When an input is put into event queue, processing logic can analyse the input queue based on the rules and formulae defined by the author. It can then raises a new input (such as a simplification of the input or important events that need to be dealt with immediately) when the rules and formulae say so.

Any human-like response to stimuli can be recorded in an appropriate knowledge library. This will generally be operative responses for a particular apparatus or activity. It may include such things as emotional responses, social features and gestures.

In educational settings, the output of the HRE could appear as a prompting instructor with appropriately smiling, frowning or neutral human face, providing instructional information.

The combination of instructional knowledge libraries with task based knowledge libraries enables instructional material to be created as a simple by-product using a system.

The HRE can provide over-the-shoulder, human like guidance or tutoring by examining the input stimuli and the operator's responses, and comparing these to the responses recorded in the knowledge libraries. The manner of the response—whether information, prompting, or pre-emptive action can be determined by the selection of the appropriate teaching knowledge library.

The HRE can use various libraries for analysis using stored human response data to, depending on the associated knowledge library selected, correct and warn of user actions that are incorrect; detect operator problems; suggest solutions to any problems detected; intervene; provide what if analysis or act for the user when operator error occurs or provide human responses in a real-time prompted instruction format offering instantaneous over the shoulder guidance and intervention instead of referral style training or help.

The HRE may act in concert with a human operator, providing assistance, instruction or support or it may act independently of a human operator in order to undertake tasks which would otherwise require a human operator.

When acting in concert with a skilled operator the HRE learns from every situation where the operator encounters a new set of stimuli or rejects the response suggested by the HRE. The system records or authors this new set of stimuli and responses into the appropriate knowledge library.

Where the system is in an instructional mode the correct response is shown and if necessary preemptively undertaken.

In documentation mode system events and actions can be recorded in fluent language.

The HRE can provide "what if . . . " knowledge scenarios which provide help if it detects a problem. The system could intervene and react to events that have been put into the system by a qualified instructor. For example, if a HRE is installed in an aeroplane and received inputs of: height too low, speed dropping, an intervention could pull the plane from imminent disaster.

Multiple instances of a HRE can be used in Device Independent Intelligence (DII) applications, where each will function independently. For example a massive traffic simulation could be achieved where each driver is represented by a HRE instance. Another example is in military simulations, where a large number of military units can be simulated, with each unit being a HRE.

HRE personalities can be a spread over the entire library database or could be in a stand alone. Alternatively centrally implemented personality libraries could be used where a HRE user can be presented with a different personality based upon the credentials supplied.

Modifications and variations as would be obvious to a person skilled in the field of the invention may be made to the present invention without departing from the spirit of the invention.

The invention claimed is:

1. A method of emulating human-like responses, the method comprising:
   storing a library comprising one or more different subject matter data structures, each data structure comprising a plurality of output instructions related to the subject matter of the data structure, each output instruction producing a human-like response and being associated with a received input stimulus, wherein the received input stimuli comprise human inputs and system inputs, the system inputs received via at least one sensor;
   associating each event with a tag;
   using the tag to determine whether an event corresponds to an important event or a non-important event;
   looking up output instructions in each data structure that are associated with the received input stimulus;
   outputting, via a human output API, one or more responses to the received stimulus according to a found output instruction when the event corresponds to an important event, wherein the one or more responses are ordered according to a priority rating;
   placing non-important events in an event queue;
   applying logical rules to the non-important events to determine whether a plurality of non-important events are collectively indicative of an important event; and outputting, via a human output API, one or more responses when the logical rules determine that the plurality of non-important events are collectively indicative of an important event, wherein the one or more responses are ordered according to a priority rating;

wherein the one or more different subject matter data structures are arranged such that the output instructions which produce the human-like response are grouped hierarchically according to their respective associated stimuli.

2. A method as claimed in claim 1, wherein the method comprises, in response to the looking up output instructions in each data structure that are associated with the received input stimulus, combining the output instructions found, and outputting a produced response to the received input stimulus.

3. A method as claimed in claim 1, wherein the output instructions produce the response in the form of one or more of the following: language, an animated graphical display, voice characteristics, and/or control signals.

4. A method as claimed in claim 3, wherein where the response is in the form of language, the response is in the form of one or more sentences constructed of one or more sentence segments, wherein each sentence segment conveys a coherent meaningful piece of information.

5. A method as claimed in claim 4, wherein the one or more sentence segments are constructed of one or more words that have a relevant meaning in response to the associated stimulus.

6. A method as claimed in claim 5, wherein the one or more sentence segments are human authored and are of the same type of response that a human would make if the human received the input stimulus.

7. A method as claimed in claim 4, wherein each of the sentence segments is associated with a sentence position category, which indicates where within a complete sentence the sentence segment is permitted to be located.

8. A method as claimed in claim 7, wherein sentences are constructed from the associated sentence segments according to their permitted location with each sentence according to the associated sentence position category/categories.

9. A method as claimed in claim 4, wherein each output instruction is associated with one sentence segment or a scripted sentence.

10. A method as claimed in claim 1, wherein each data structure is arranged in a plurality of levels, where output instructions are grouped in the same level according to contextually related associated input stimuli.

11. A method as claimed in claim 10, wherein matching of an input stimulus to an associated output instruction is initially limited to looking within one level of the data structure and will only search outside the level if a match is not found.

12. A method as claimed in claim 11, wherein a previous level within which a match was found is recorded which initiates the next search for a match within the same level.

13. A method as claimed in claim 11, wherein a previous level within which a match was found is recorded which initiates the next search for a match within the next level down relative to the previous level.

14. A method as claimed in claim 11, wherein in the event a match is not found within the current level, searching will proceed to parallel levels and then up through the levels of the data structure.

15. A method as claimed in claim 1, wherein searching for matches of the received input stimulus to an associated output instruction will progress through the hierarchy if a match is not found.

16. A method as claimed in claim 11, wherein a history of matches is recorded, such that in the event that a match is not found in a level, and there is a choice of which level to search next, the history of matches is used to choose which level to search next.

17. A method as claimed in claim 1, wherein the stimulus is in the form of a human generated stimulus, an environmental stimulus, or a machine generated stimulus.

18. A method as claimed in claim 1, wherein the received input stimulus is in the form of speech.

19. A method as claimed in claim 4, wherein alternative sentence segments having different form but having the same meaning are stored in the data structure and when a match occurs one of the alternatives is chosen in a random manner for output.

20. A method as claimed in claim 1, wherein when no output instructions are found that are associated to the received input stimulus in the data structure, a new received input stimulus is recorded and a new output instruction for producing a response is input in a data structure, the response being taught by a human by providing instructions for producing the response.

21. A method as claimed in claim 20, wherein when the output instruction associated with the new received input stimulus is added to the data structure, a level within the hierarchy is allocated and recorded.

22. A method as claimed in claim 1, wherein the received input stimulus is pre-processed prior to look-up of a match.

23. A method as claimed in claim 22, wherein the pre-processing involves applying mathematical and/or logical operations to the received input stimulus.

24. A method as claimed in claim 1, wherein the library comprises selected data structures such that the human-like responses produced reflect a personality, in that the human-like responses are those which the personality would make.

25. A method as claimed in claim 1, wherein the library comprises selected response instructions that are instructional to a human observer.

26. A method as claimed in claim 1, wherein the library comprises selected response instructions that are constructed to document events reflected by the input stimulus.

27. A human-like response emulator comprising:
a library stored on a storage device, the library comprising one or more different subject matter data structures, each data structure comprising a plurality of output instructions related to the subject matter of the data structure, each output instruction producing a human-like response and being associated with a received input stimulus, wherein the received input stimuli comprise human inputs and system inputs;
an input device for receiving the input stimulus including at least one sensor to receive the system inputs;
a look-up device for looking up output instructions in each data structure that are associated with the received input stimulus; and
an output device for delivering one or more responses to the received stimuli according to the output instructions found by the look-up device;
the emulator associating each event with a tag, using the tag to determine whether an event corresponds to an important event or a non-important event, and placing non-important events in an event queue;
the output device outputting, via a human output API, one or more responses to the received stimulus according to a found output instruction when the event corresponds to an important event, wherein the one or more responses are ordered according to a priority rating;

the emulator applying logical rules to the non-important events to determine whether a plurality of non-important events are collectively indicative of an important event; and the output device outputting, via a human output API, one or more responses when the logical rules determine that the plurality of non-important events are collectively indicative of an important event, wherein the one or more responses are ordered according to a priority rating;

wherein the one or more different subject matter data structures are arranged such that the output instructions which produce the human-like response are grouped hierarchically according to their respective associated stimuli.

28. An apparatus for emulating human-like responses, the apparatus comprising:

a storage for storing a library comprising one or more different subject matter data structures, each data structure comprising a plurality of output instructions related to the subject matter of the data structure, each output instruction producing a human-like response and being associated with an input stimulus, wherein the received input stimuli comprise human inputs and system inputs;

a receiver for receiving an input stimulus including at least one sensor to receive the system inputs;

a processor for looking up output instructions in each data structure that are associated with the received input stimulus;

an output for outputting, via a human output API, one or more responses to the received stimulus according to found output instructions;

the apparatus associating each event with a tag, using the tag to determine whether an output instruction corresponds to an important event or a non-important event, and placing non-important events in an event queue;

the output outputting one or more responses to the received stimulus according to a found output instruction when the event corresponds to an important event, wherein the one or more responses are ordered according to a priority rating;

the apparatus applying logical rules to the non-important events to determine whether a plurality of non-important events are collectively indicative of an important event; and the output outputting, via a human output API, one or more responses when the logical rules determine that the plurality of non-important events are collectively indicative of an important event, wherein the one or more responses are ordered according to a priority rating;

wherein the one or more different subject matter data structures are arranged such that the output instructions are grouped hierarchically according to their respective associated stimuli.

* * * * *